(12) United States Patent
Lee et al.

(10) Patent No.: US 8,189,493 B2
(45) Date of Patent: May 29, 2012

(54) METHOD FOR TRIGGERING A MEASUREMENT REPORT OF MOBILE TERMINAL

(75) Inventors: Young-Dae Lee, Gyeonggi-Do (KR); Sung-Duck Chun, Gyeonggi-Do (KR); Sung-Jun Park, Gyeonggi-Do (KR); Seung-June Yi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 290 days.

(21) Appl. No.: 12/595,459

(22) PCT Filed: Apr. 29, 2008

(86) PCT No.: PCT/KR2008/002426
§ 371 (c)(1),
(2), (4) Date: Oct. 9, 2009

(87) PCT Pub. No.: WO2008/133471
PCT Pub. Date: Nov. 6, 2008

(65) Prior Publication Data
US 2010/0182919 A1 Jul. 22, 2010

Related U.S. Application Data

(60) Provisional application No. 60/915,042, filed on Apr. 30, 2007, provisional application No. 60/915,417, filed on May 1, 2007, provisional application No. 60/915,917, filed on May 3, 2007.

(30) Foreign Application Priority Data

Apr. 24, 2008 (KR) .................. 10-2008-0038329

(51) Int. Cl.
*H04J 1/16* (2006.01)
(52) U.S. Cl. ....................................... 370/252; 370/394

(58) Field of Classification Search .................. 370/230, 370/229, 230.1, 231, 232, 235, 241, 216, 370/252, 310, 329, 332, 331, 394, 395.2, 370/471, 472, 473, 474; 455/423, 425, 414.3, 455/414.4, 63.1, 67.14; 709/224, 225, 226, 709/227, 228, 229
See application file for complete search history.

(56) References Cited

U.S. PATENT DOCUMENTS
4,205,200 A    5/1980   Parikh et al.
(Continued)

FOREIGN PATENT DOCUMENTS
AU    2007314859 B2    5/2008
(Continued)

OTHER PUBLICATIONS

"Email Rapporteur (Nokia), DRX in E-UTRAN," 3GPP TSG-RAN WG2 Meeting # 57, St. Louis, Missouri, Feb. 12-16, 2007.

(Continued)

*Primary Examiner* — Chi Pham
*Assistant Examiner* — Abdullah Riyami
(74) *Attorney, Agent, or Firm* — Birch, Stewart, Kolasch & Birch, LLP

(57) ABSTRACT

In a wireless mobile communications system, a method for transmitting and receiving a measurement report of a mobile terminal is provided. A network transmits a paging message to the mobile terminal for performing the measurement report or transmits a PDU (Protocol Data Unit) having segmented SDU (Service Data Unit). The mobile terminal transmits the measurement report upon receiving the paging message or the PDU having the segmented SDU, thereby utilizing a radio resource effectively.

6 Claims, 3 Drawing Sheets

U.S. PATENT DOCUMENTS

| | | | |
|---|---|---|---|
| 6,131,030 | A | 10/2000 | Schon et al. |
| 6,445,917 | B1 | 9/2002 | Bark et al. |
| 6,725,267 | B1 | 4/2004 | Hoang |
| 6,795,419 | B2 | 9/2004 | Parantainen et al. |
| 6,965,588 | B2 | 11/2005 | Schmidt et al. |
| 6,982,959 | B1 | 1/2006 | Salonaho et al. |
| 7,003,290 | B1 | 2/2006 | Salonaho et al. |
| 7,245,707 | B1 | 7/2007 | Chan |
| 7,443,813 | B2 | 10/2008 | Hwang et al. |
| 7,551,643 | B2 | 6/2009 | Yeo et al. |
| 7,680,058 | B2 | 3/2010 | Seurre et al. |
| 7,769,351 | B2 | 8/2010 | Kwak et al. |
| 7,801,527 | B2 | 9/2010 | Putcha |
| 7,899,451 | B2 | 3/2011 | Hu et al. |
| 7,912,471 | B2 | 3/2011 | Kodikara Patabandi et al. |
| 7,958,542 | B2 | 6/2011 | Herrmann |
| 8,064,676 | B2 | 11/2011 | Li et al. |
| 2001/0017850 | A1 | 8/2001 | Kalliokulju et al. |
| 2002/0028690 | A1 | 3/2002 | McKenna et al. |
| 2002/0057663 | A1 | 5/2002 | Lim |
| 2002/0059464 | A1 | 5/2002 | Hata et al. |
| 2002/0091860 | A1 | 7/2002 | Kalliokulju et al. |
| 2003/0007490 | A1 | 1/2003 | Yi et al. |
| 2003/0007512 | A1 | 1/2003 | Tourunen et al. |
| 2003/0050078 | A1 | 3/2003 | Motegi et al. |
| 2003/0123485 | A1 | 7/2003 | Yi et al. |
| 2003/0147371 | A1 | 8/2003 | Choi et al. |
| 2003/0165122 | A1 | 9/2003 | Westphal |
| 2003/0165133 | A1 | 9/2003 | Garani |
| 2003/0189922 | A1 | 10/2003 | Howe |
| 2003/0207696 | A1 | 11/2003 | Willenegger et al. |
| 2004/0014452 | A1 | 1/2004 | Lim et al. |
| 2004/0042507 | A1 | 3/2004 | Pelletier et al. |
| 2004/0100940 | A1 | 5/2004 | Kuure et al. |
| 2004/0117860 | A1 | 6/2004 | Yi et al. |
| 2004/0121771 | A1 | 6/2004 | Song et al. |
| 2004/0148427 | A1 | 7/2004 | Nakhjiri et al. |
| 2004/0180675 | A1 | 9/2004 | Choi et al. |
| 2004/0185837 | A1* | 9/2004 | Kim et al. .................. 455/414.3 |
| 2004/0229605 | A1 | 11/2004 | Hwang et al. |
| 2004/0253959 | A1 | 12/2004 | Hwang et al. |
| 2005/0009527 | A1* | 1/2005 | Sharma ......................... 455/445 |
| 2005/0032555 | A1 | 2/2005 | Jami et al. |
| 2005/0041610 | A1 | 2/2005 | Lee et al. |
| 2005/0041681 | A1 | 2/2005 | Lee et al. |
| 2005/0063347 | A1 | 3/2005 | Sarkkinen et al. |
| 2005/0085254 | A1 | 4/2005 | Chuah et al. |
| 2005/0094670 | A1 | 5/2005 | Kim |
| 2005/0111394 | A1 | 5/2005 | Jung et al. |
| 2005/0141462 | A1 | 6/2005 | Aerrabotu et al. |
| 2005/0141541 | A1* | 6/2005 | Cuny et al. .................. 370/437 |
| 2005/0160184 | A1 | 7/2005 | Walsh et al. |
| 2005/0164719 | A1 | 7/2005 | Waters |
| 2005/0176430 | A1 | 8/2005 | Lee et al. |
| 2005/0176474 | A1 | 8/2005 | Lee et al. |
| 2005/0185620 | A1 | 8/2005 | Lee et al. |
| 2005/0232271 | A1 | 10/2005 | Kettunen et al. |
| 2005/0238051 | A1 | 10/2005 | Yi et al. |
| 2005/0265294 | A1 | 12/2005 | Hu et al. |
| 2005/0286470 | A1 | 12/2005 | Asthana et al. |
| 2006/0034335 | A1 | 2/2006 | Karaoguz et al. |
| 2006/0067324 | A1 | 3/2006 | Kim et al. |
| 2006/0067364 | A1 | 3/2006 | Jung et al. |
| 2006/0087994 | A1 | 4/2006 | Barth et al. |
| 2006/0098567 | A1 | 5/2006 | Willenegger et al. |
| 2006/0098688 | A1* | 5/2006 | Parkvall et al. ................ 370/477 |
| 2006/0126554 | A1 | 6/2006 | Motegi et al. |
| 2006/0165045 | A1 | 7/2006 | Kim et al. |
| 2006/0203760 | A1 | 9/2006 | Fukui et al. |
| 2006/0209870 | A1 | 9/2006 | Lee et al. |
| 2006/0218271 | A1* | 9/2006 | Kasslin et al. ................ 709/224 |
| 2006/0245417 | A1 | 11/2006 | Conner et al. |
| 2006/0251105 | A1* | 11/2006 | Kim et al. .................... 370/449 |
| 2006/0262811 | A1* | 11/2006 | Jiang ........................... 370/474 |
| 2007/0024972 | A1 | 2/2007 | Kuerz et al. |
| 2007/0047452 | A1 | 3/2007 | Lohr et al. |
| 2007/0047582 | A1 | 3/2007 | Malkamäki |
| 2007/0060139 | A1 | 3/2007 | Kim et al. |
| 2007/0064631 | A1* | 3/2007 | Tseng et al. .................. 370/278 |
| 2007/0155389 | A1 | 7/2007 | Zhang |
| 2007/0165567 | A1 | 7/2007 | Tan et al. |
| 2007/0165635 | A1 | 7/2007 | Zhang et al. |
| 2007/0177569 | A1 | 8/2007 | Lundby |
| 2007/0206531 | A1 | 9/2007 | Pajukoski et al. |
| 2007/0248075 | A1 | 10/2007 | Liu et al. |
| 2007/0258591 | A1 | 11/2007 | Terry et al. |
| 2007/0291646 | A1 | 12/2007 | Ohishi et al. |
| 2007/0291673 | A1 | 12/2007 | Demirhan et al. |
| 2007/0291719 | A1 | 12/2007 | Demirhan et al. |
| 2007/0291728 | A1 | 12/2007 | Dalsgaard et al. |
| 2007/0291729 | A1 | 12/2007 | Dalsgaard et al. |
| 2007/0291788 | A1 | 12/2007 | Sammour et al. |
| 2007/0293224 | A1 | 12/2007 | Wang et al. |
| 2008/0009289 | A1* | 1/2008 | Kashima et al. .............. 455/436 |
| 2008/0025263 | A1 | 1/2008 | Pelkonen |
| 2008/0043619 | A1 | 2/2008 | Sammour et al. |
| 2008/0056198 | A1* | 3/2008 | Charpentier et al. ......... 370/332 |
| 2008/0056273 | A1 | 3/2008 | Pelleter et al. |
| 2008/0064390 | A1* | 3/2008 | Kim .............................. 455/425 |
| 2008/0076359 | A1* | 3/2008 | Charpentier et al. ........ 455/63.1 |
| 2008/0089285 | A1* | 4/2008 | Pirskanen et al. ............. 370/329 |
| 2008/0095185 | A1 | 4/2008 | DiGirolamo et al. |
| 2008/0101268 | A1 | 5/2008 | Sammour et al. |
| 2008/0167089 | A1 | 7/2008 | Suzuki et al. |
| 2008/0181127 | A1 | 7/2008 | Terry et al. |
| 2008/0182594 | A1 | 7/2008 | Flore et al. |
| 2008/0188223 | A1 | 8/2008 | Vesterinen et al. |
| 2008/0225744 | A1* | 9/2008 | DiGirolamo et al. ......... 370/252 |
| 2008/0225765 | A1 | 9/2008 | Marinier et al. |
| 2008/0240439 | A1 | 10/2008 | Mukherjee et al. |
| 2008/0267126 | A1 | 10/2008 | Vujcic et al. |
| 2008/0273610 | A1 | 11/2008 | Malladi et al. |
| 2008/0280567 | A1 | 11/2008 | Sharma |
| 2008/0310452 | A1 | 12/2008 | Vedantham et al. |
| 2009/0022107 | A1 | 1/2009 | Kapoor et al. |
| 2009/0040982 | A1 | 2/2009 | Ho et al. |
| 2009/0086659 | A1 | 4/2009 | Pani et al. |
| 2009/0086710 | A1 | 4/2009 | Ho |
| 2009/0092076 | A1 | 4/2009 | Zheng et al. |
| 2009/0109912 | A1 | 4/2009 | DiGirolamo et al. |
| 2009/0124259 | A1 | 5/2009 | Attar et al. |
| 2009/0143074 | A1 | 6/2009 | Pelletier et al. |
| 2009/0163199 | A1 | 6/2009 | Kazmi et al. |
| 2009/0181710 | A1 | 7/2009 | Pani et al. |
| 2009/0207771 | A1 | 8/2009 | Lindskog et al. |
| 2009/0318170 | A1 | 12/2009 | Lee et al. |
| 2010/0027413 | A1 | 2/2010 | Park et al. |
| 2010/0061330 | A1 | 3/2010 | Hanov |
| 2010/0128669 | A1 | 5/2010 | Chun et al. |
| 2010/0165901 | A1 | 7/2010 | Kim |
| 2010/0227614 | A1 | 9/2010 | Chun et al. |
| 2010/0238799 | A1 | 9/2010 | Sebire |
| 2010/0272004 | A1 | 10/2010 | Maeda et al. |
| 2010/0309877 | A1 | 12/2010 | Damnjanovic et al. |
| 2011/0039536 | A1 | 2/2011 | Lee et al. |
| 2011/0116436 | A1 | 5/2011 | Bachu et al. |

FOREIGN PATENT DOCUMENTS

| | | |
|---|---|---|
| CN | 1719932 A | 1/2006 |
| EP | 1148735 A1 | 10/2001 |
| EP | 1168877 A1 | 1/2002 |
| EP | 1209938 A1 | 5/2002 |
| EP | 1304898 A1 | 4/2003 |
| EP | 1 315 356 A2 | 5/2003 |
| EP | 1 318 632 A2 | 6/2003 |
| EP | 1337124 A2 | 8/2003 |
| EP | 1372310 A1 | 12/2003 |
| EP | 1511245 A2 | 3/2005 |
| EP | 1720322 A1 | 11/2006 |
| EP | 1720373 A1 | 11/2006 |
| JP | 6-6294 A | 1/1994 |
| JP | 2002-539686 T | 11/2002 |
| JP | 2003-504935 T | 2/2003 |
| JP | 2003-87180 A | 3/2003 |
| JP | 2003-235064 A | 8/2003 |
| JP | 2005-354488 A | 12/2005 |
| JP | 2006-505979 T | 2/2006 |

| | | | |
|---|---|---|---|
| JP | 2006-067115 A | 3/2006 | |
| JP | 2006-515737 T | 6/2006 | |
| JP | 2007-165635 A | 6/2007 | |
| JP | 2008-535370 A | 8/2008 | |
| JP | 2008-539678 A | 11/2008 | |
| JP | 2009-540721 A | 11/2009 | |
| JP | 2009-542100 A | 11/2009 | |
| KR | 10-2001-0105240 A1 | 11/2001 | |
| KR | 10-2004-0039944 A | 5/2004 | |
| KR | 10-2004-0048675 A | 6/2004 | |
| KR | 10-2005-0008440 A | 1/2005 | |
| KR | 10-2005-0027972 A | 3/2005 | |
| KR | 10-2005-0096763 A | 10/2005 | |
| RU | 2249917 C2 | 3/2003 | |
| WO | WO 00/54521 A2 | 9/2000 | |
| WO | WO-00/74416 A1 | 12/2000 | |
| WO | WO 01/05050 A1 | 1/2001 | |
| WO | WO 2004/043099 A2 | 5/2004 | |
| WO | WO 2004/064272 A1 | 7/2004 | |
| WO | WO 2006/049441 A1 | 5/2006 | |
| WO | WO 2006/075820 A1 | 7/2006 | |
| WO | WO-2006/104344 A2 | 10/2006 | |
| WO | WO 2006/109851 A1 | 10/2006 | |
| WO | WO 2006/116620 A2 | 11/2006 | |
| WO | WO 2007/025138 A2 | 3/2007 | |
| WO | WO-2007/052888 A2 | 5/2007 | |
| WO | WO-2007/078172 A2 | 7/2007 | |
| WO | WO 2007/078929 A2 | 7/2007 | |
| WO | WO-2007078155 A2 | 7/2007 | |
| WO | WO-2007/133034 A2 | 11/2007 | |
| WO | WO 2008/054103 A1 | 5/2008 | |
| WO | WO 2008/111684 A1 | 9/2008 | |
| WO | WO 2009/084998 A1 | 7/2009 | |

OTHER PUBLICATIONS

"Nokia: Active Mode DRX Details," 3GPP TSG-RAN WGx Meeting # 55, Seoul, Republic of Korea, Oct. 9-13, 2006.
"NTT DoCoMo, Inc., Views on DRX/DTX Control in LTE," 3GPP TSG RAN WG2 # 56, Nov. 6-10, 2006, Riga, Latvia.
"3rd Generation Partnership Project; Technical Specification Group Radio Access Network; Packet Data Convergence Protocol (PDCP) specification (Release 7)," XP-050367856; pp. 1-44; Mar. 2007.
"Granulatity consideration for variable RLC PDU sizes," 3GPP TSG-RAN WG2 Meeting # 56bis; R2-070336, XP050133423; pp. 1-3, Jan. 15-19, 2007.
"3rd Generation Partnership Project; Technical Specification Group Radio Access Network; Medium Access Control (MAC) protocol specification (Release 7),"; XP050367709; pp. 1-126; Mar. 2007.
"Header Compression Signaling," TSG-RAN Working Group 2 (Radio layer 2 and Radio layer 3); TSGR2#9(99)i32; Bosch; XP050114120; pp. 1-2, Nov. 29, 1999.
Gao, Youjun, et al., "Research on the Access Network and MAC Technique for Beyond 3G Systems," IEEE Wireless Communication; XP011184637; pp. 57-61; Apr. 2007.
Sammour et al., U.S. Appl. No. 60/863,185.
"Requirements for Redirection in E-UTRAN", 3GPP TSG-RAN WG2 Meeting #56-bis, Jan. 15-19, 2007, Sorrento; Italy.
"Layer 2 Function for LTE", 3GPP TSG RAN WG2 #48bis, Oct. 10-14, 2005, Cannes; Frances.
"Selective Forwarding/Retransmission During HO", 3GPP TSG-RAN2 Meeting #56bis, Jan. 15-19, 2007, Sorrento; Italy.
"Re-use of PDCP SN at ARQ level ?", 3GPP TSG-RAN2 Meeting #53bis, Jun. 27-30, 2006, Cannes; France.
Catt et al: "Enhancement to Buffer Status Reporting" 3GPP TSG-RAN WG2#57bis, Mar. 22, 2007, St Julian's, Malta.
NTT DoCoMo et al: "MAC PDU structure for LTE" 3GPP TSG RAN WG2 #56bis, Jan. 15-19, 2007, Sorrento, Italy.
LG Electronics Inc., "Contents of PDCP Status Report R2-07xxxx", 3rd Generation Partnership Project (3GPP) TSG-RAN WG2 59, Shanghai, China, Oct. 8, 2007, http://www.3gpp.org/ftp/tsg_ran/WG2_RL2/TSGR2_59bis/Docs, XP002580785.
LG Electronics Inc., "PDCP retransmissions", 3rd Generation Partnership Project (3GPP) Draft, R2-073041, Mobile Competence Centre, Aug. 16, 2007, XP050135778.
LG Electronics Inc., "PDCP Structure and Traffic Path", 3rd Generation Partnership Project (3GPP) Draft, R2-073259, Mobile Competence Centre, Aug. 16, 2007, XP050135985.
Sammour et al., U.S. Appl. No. 60/863,185, filed Oct. 27, 2006.
"3rd Generation Partnership Project; Technical Specification Group Radio Access Network; Evolved Universal Terrestrial Radio Access (E-UTRA) Medium Access Control (MAC) protocol specification (Release 8)," 3GPP TS 36.321 V8.1.0, XP-050377617, Mar. 2008.
"DL Control Signaling and Multiplexing for VoIP," 3GPP TSG RAN WG1 Meeting #48bis, R1-071721, XP-002460800, Mar. 2007.
"MAC Header Format," 3GPP TSG-RAN WG2 Meeting # 59bis, R2-073891, XP-002602993, Oct. 2007.
"Support for VoIP over MAC-hs/ehs," 3GPP TSG-RAN WG2 #57bis, R2-071542, XP-050134474, Mar. 2007.
"UL Timing Control related to Contention Resolution," 3GPP TSG-RAN WG2#61bis, R2-081607, XP-050139334, Mar. 2008.
LG Electronics Inc., Relative Buffer Status Reporting, 3GPP TSG-RAN WG2 meeting #46bis, Apr. 4-8, 2005, Beijing, China. (R2-050852).
Panasonic, MAC PDU format for LTE, 3GPP TSG RAN WG2 #56bis, Jan. 15-19, 2007, Sorrento, Italy. (R2-070096).
3GPP TSG-RAN WG2#57, "MAC Header for Improved L2 Support for High Data Rates", R2-070810, 3rd Generation Partnership Project (3GPP), vol. RAN WG2, Feb. 9, 2007, XP050133836.
IPWireless, "Contention Resolution in Non-synchronous RACH Access," RAN2#54, Tdoc R2-062269, Aug. 28-Sep. 1, 2006, Tallinn, Estonia, 5 pages.
LG Electronics, "Discussion on Message 4 in Random Access," 3GPP TSG-RAN WG2 #57, R2-070519, St. Louis, USA, Feb. 15-19, 2007, pp. 1-4.
LG Electronics, "Discussion on Message 4 in Random Access," 3GPP TSG-RAN WG2 #57bis, R2-071456, St. Julian's, Malta, Mar. 26-30, 2007, pp. 1-4.
LG Electronics, "Discussion on Message 4 in Random Access," 3GPP TSG-RAN WG2 #58, R2-071923, Kobe, Japan, May 7-11, 2007, pp. 1-4.
LG Electronics, "U-plane ciphering at MAC/Physical Layer," 3GPP TSG RAN WG2#57bis, R2-071550, St Julian's, Malta, Mar. 26-30, 2007. pp. 1-3.

* cited by examiner

[Fig. 1]
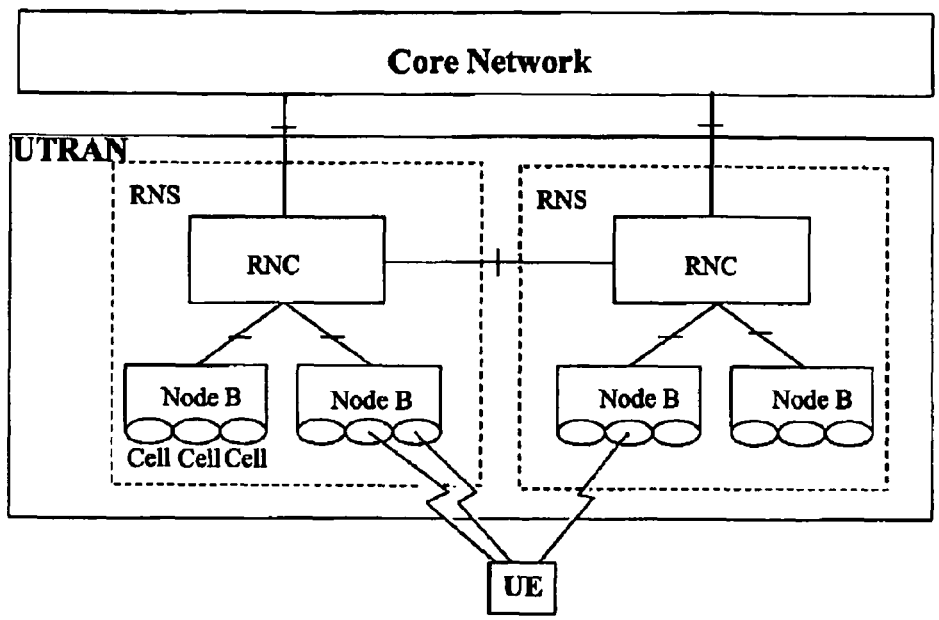
[Fig. 2]
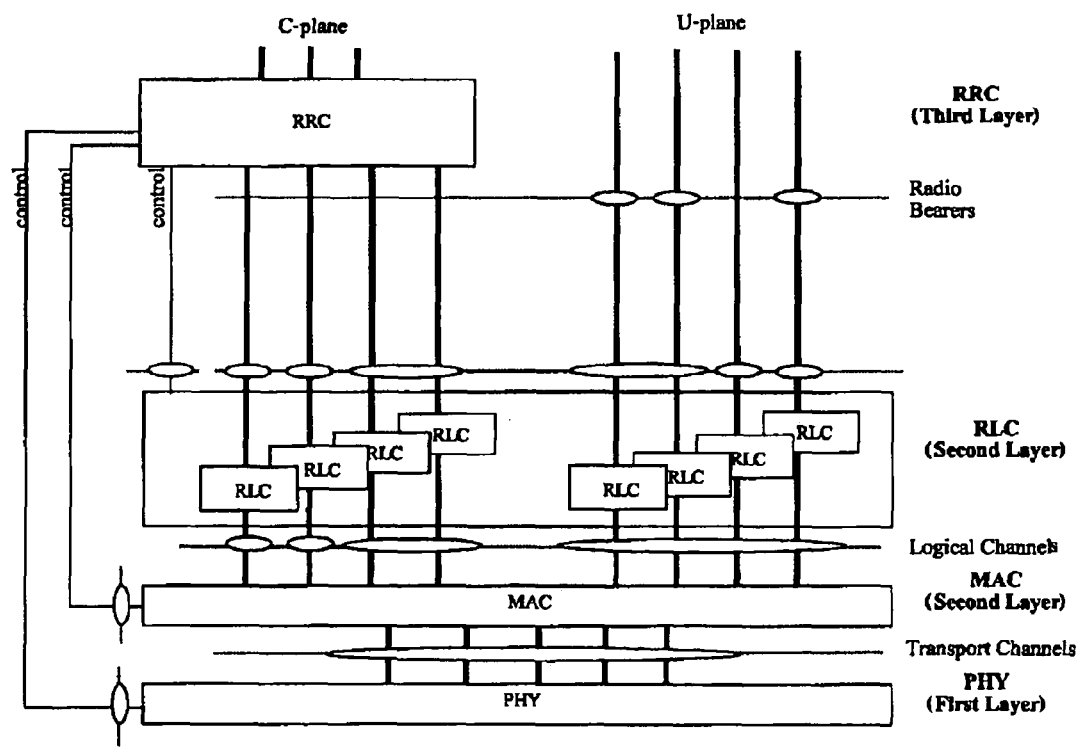

[Fig. 3]
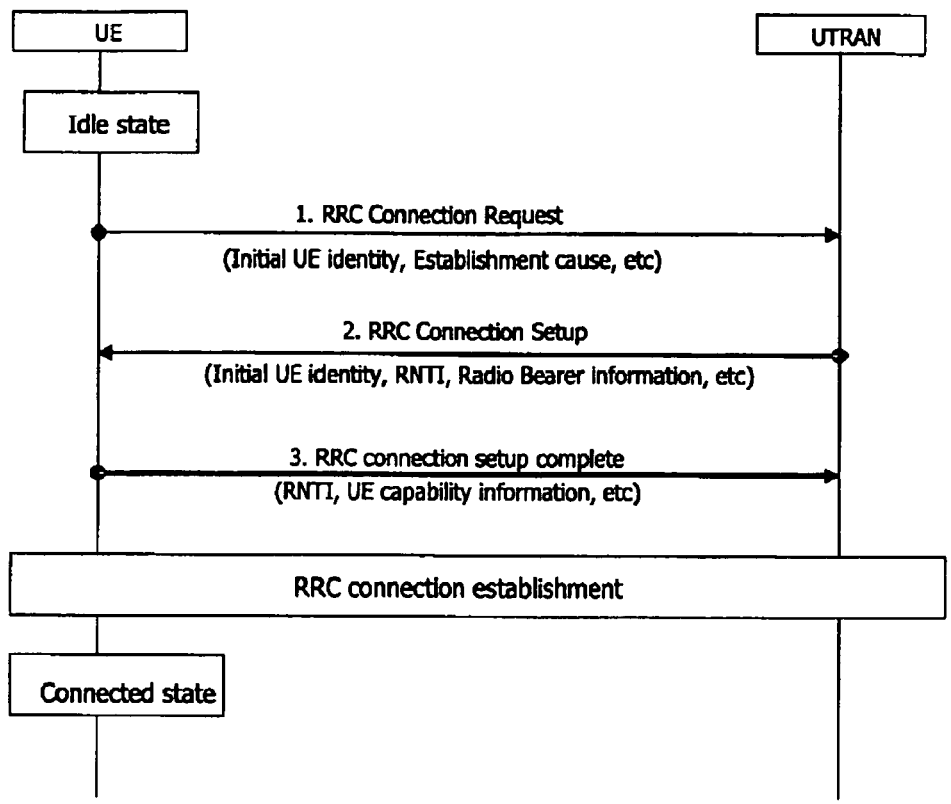
[Fig. 4]
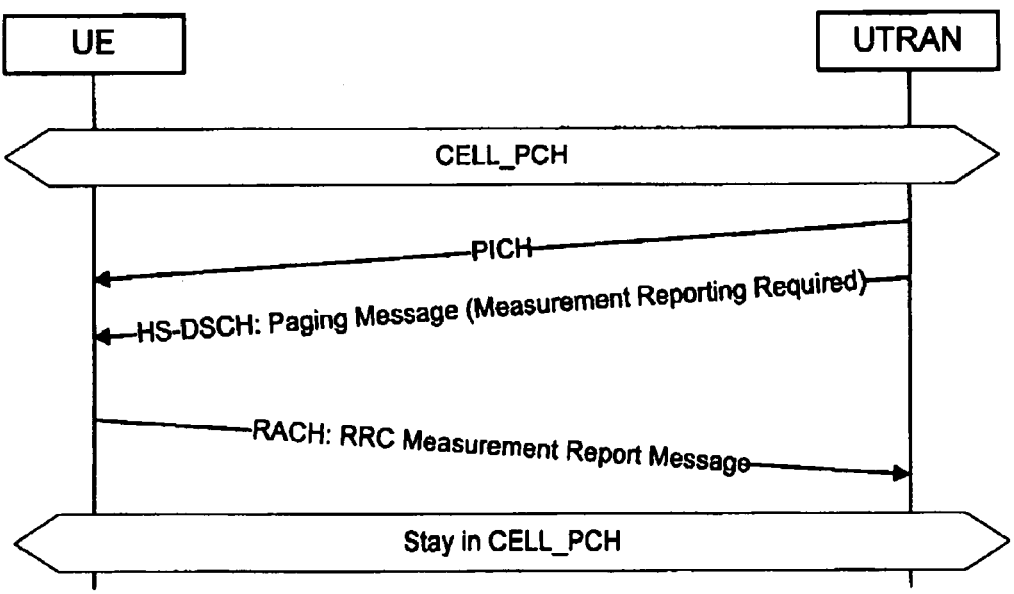

[Fig. 5]
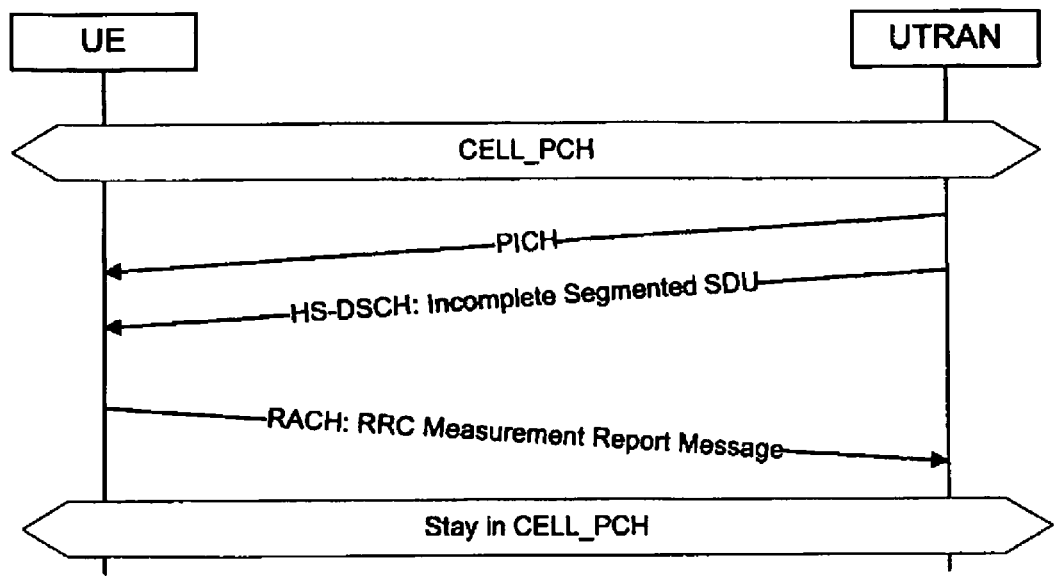
[Fig. 6]
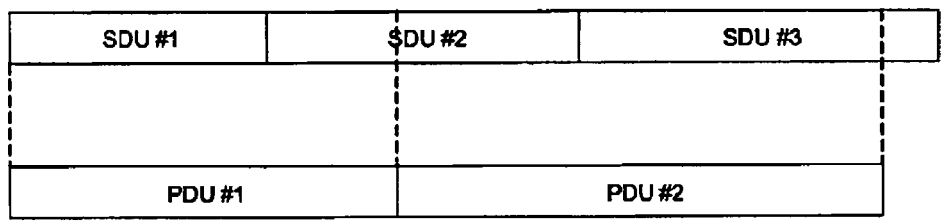
[Fig. 7]
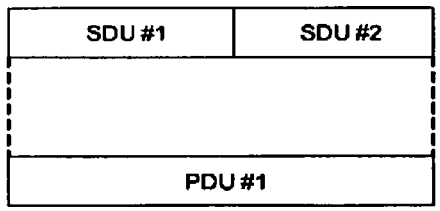

METHOD FOR TRIGGERING A MEASUREMENT REPORT OF MOBILE TERMINAL

This application is a National Phase of PCT/KR2008/002426 filed on Apr. 29, 2008, which claims priority under 35 U.S.C. §119(e) to U.S. Provisional Application Nos. 60/915,042 filed on Apr. 30, 2007, 60/915,417 filed on May 1, 2007, and 60/915,917 filed on May 3, 2007 and under 35 U.S.C. 119(a) to Patent Application No. 10-2008-0038329 filed on Apr. 24, 2008 all of which are hereby expressly incorporated by reference into the present application.

TECHNICAL FIELD

The present invention relates to a measurement report method of a mobile terminal, and more particularly, in order to use radio resources more effectively, a network (i.e., UTRAN, Node B, eNB, etc) transmits a paging message to the mobile terminal for performing the measurement report or transmits a PDU (Protocol Data Unit) including segmented SDU(s) (Service Data Units). The mobile terminal transmits the measurement report upon receiving the paging message or the PDU including the segmented SDU(s).

BACKGROUND ART

The universal mobile telecommunications system (UMTS) is a third-generation mobile communications system evolving from the global system for mobile communications system (GSM), which is the European standard. The UMTS is aimed at providing enhanced mobile communications services based on the GSM core network and wideband code-division multiple-access (W-CDMA) technologies.

FIG. 1 shows an exemplary diagram illustrating an Universal Mobile Telecommunication System (UMTS) network of a conventional mobile communication system. The UMTS is comprised of, largely, a user equipment (UE) or a mobile terminal (referred to a terminal hereafter), a UMTS Terrestrial Radio Access Network (UTRAN), and a core network (CN). The UTRAN comprises at least one Radio Network Sub-system (RNS), and each RNS is comprised of one Radio Network Controller (RNC) and at least one base station (Node B) which is controlled by the RNC. For each Node B, there is at least one cell.

FIG. 2 is an exemplary diagram illustrating a structure of a Radio Interface Protocol (RIP) between a UE and the UTRAN. Here, the UE is associated with a 3rd Generation Partnership Project (3GPP) wireless access network standard. The structure of the RIP is comprised of a physical layer, a data link layer, and a network layer on the horizontal layers. On the vertical plane, the structure of the RIP is comprised of a user plane, which is used for transmitting data, and a control plane, which is used for transmitting control signals. The protocol layers of FIG. 2 can be categorized as L1 (first layer), L2 (second layer), and L3 (third layer) based on an Open System Interconnection (OSI) model. Each layer will be described in more detail as follows.

The first layer (L1), namely, the physical layer, provides an upper layer with an information transfer service using a physical channel. The physical layer is connected to an upper layer called a medium access control (MAC) layer through a transport channel. Data is transferred between the MAC layer and the physical layer through the transport channel. Data is also transferred between different physical layers, i.e. between physical layers of a transmitting side and a receiving side, through the physical channel.

The MAC layer of the second layer (L2) provides an upper layer called a radio link control (RLC) layer with a service through a logical channel. The RLC layer of the second layer supports reliable data transfer and performs segmentation and/or concatenation of a service data unit (SDU) received from an upper layer.

The radio resource control (RRC) layer located at the lowest portion of the third layer (L3) is only defined in the control plane, and handles the controlling of transport channels and physical channels with respect to the establishment, re-configuration, and release of radio bearers (RB). The RB refers to a service provided by the second layer (L2) for transferring data between a UE and the UTRAN. In general, an RB being established refers to providing the characteristics of the protocol layers and channels required in providing a particular service, and refers to the procedures of configuring each particular parameter and operating method.

When the RRC layer of a particular UE and the RRC layer of the UTRAN are connected to allow messages to be transferred therebetween, that particular UE is said to be in RRC connected state, while the UE is said to be in idle state when there is no connection. A UE in RRC connected state is further divided into a URA_PCH state, a CELL_PCH state, a CELL_FACH state, and a CELL_DCH state. For those UEs in idle state, in URA PCH state, or in CELL_PCH state, a discontinuous reception (DRX) method is employed to minimize power consumption by discontinuously receiving a SCCPCH (Secondary Common Control Physical Channel) to which a PICH (Paging Indicator Channel) and a PCH (Paging Channel) are mapped. During the time periods other than for receiving the PICH or the SCCPCH, the UE is in sleeping mode state.

In the related art, the UE performing the DRX (discontinuous reception) method wakes up at every CN domain specific DRX cycle length or UTRAN specific DRX cycle length to receive a UE specific paging indicator (PI) of the PICH. The related art UE specific PI is used in order to notify a particular UE that a paging message for the particular UE will be transmitted via the PICH.

The PICH is divided into PICH frames having a length of 10 ms, and a single PICH frame is comprised of 300 bits. The 288 bits in the front portion of the PICH frame are used for the UE specific PICH, and more than one UE specific PI are transmitted. The 12 bits at the end of the PICH frame are not transmitted. For convenience, the 288-bit front portion of the PICH is defined as the "UE PICH," while the 12-bit rear portion is defined as the "PICH Unused Part."

A RRC connection will be described in more detail as follows. In order to establish the RRC connection with the UTRAN, an Idle state of terminal has to perform a RRC connection procedure. FIG. 3 shows an exemplary diagram for explaining how a RRC connection is established. As illustrated in FIG. 3, to establish the RRC connection, the terminal transmits a RRC Connection Request Message to the UTRAN, and then the UTRAN transmits a RRC Connection Setup Message to the terminal in response to the RRC Connection Request Message. After receiving the RRC Connection Setup Message by the terminal, the terminal transmits a RRC Connection Setup Complete Message to the UTRAN. If the above steps are successfully completed, the terminal establishes the RRC connection with the UTRAN.

In the related art, if the UTRAN transmits a downlink data to the terminal, which is in a CELL_PCH state, the UTRAN transmit the downlink data without receiving a measurement report from the terminal. In this case, the UTRAN can not possibly transmit the downlink data with using suitable or appropriate transmission parameters (i.e., transmission power, AMC, etc) with respect to the current radio channel situation. This would cause great drawbacks of wasting radio resources and delaying of transmission time, as the radio resources are being used ineffectively.

DISCLOSURE OF INVENTION

Technical Solution

The present invention has been developed in order to solve the above described problems of the related art. As a result, the present invention provides a method of transmitting or receiving a measurement report of a terminal, thereby utilizing radio resources in improved and efficient manner.

To implement at least the above feature in whole or in parts, the present invention may provide a method of transmitting a measurement report of a mobile terminal in a wireless communications system, the method comprising: receiving at least one PDU (Protocol Data unit) including segmented SDU(s) (Service Data Unit); and determining whether or not to transmit the measurement report based on the segmented SDU(s) included in the received at least one PDU. The present invention may provide a method of transmitting a measurement report of a mobile terminal, the method comprising: receiving at least one PDU (Protocol Data unit) including a segmented SDU (Service Data Unit); and transmitting the measurement report to a network if the segmented SDU can not be completely reconfigured. Also, The present invention may provide a method of transmitting a measurement report of a corresponding mobile terminal, the method comprising: monitoring a paging channel while performing a DRX (Discontinuous Reception); receiving a data channel including a paging message if the paging channel indicates the corresponding mobile terminal; and triggering the measurement report of the corresponding mobile terminal if the paging message indicates to trigger for the measurement report of the corresponding mobile terminal.

Additional features of this disclosure will be set forth in part in the description which follows and in part will become apparent to those having ordinary skill in the art upon examination of the following or may be learned from practice of this disclosure. The objectives and other advantages of this disclosure may be realized and attained by the structure particularly pointed out in the written description and claims hereof as well as the appended drawings.

BRIEF DESCRIPTION OF THE DRAWINGS

The accompanying drawings, which are included to provide a further understanding of this disclosure and are incorporated in and constitute a part of this specification, illustrate embodiments of this disclosure and together with the description serve to explain the principles of this disclosure.

In the drawings:

FIG. 1 is an exemplary network structure showing a Universal Mobile Telecommunications System (UMTS).

FIG. 2 shows an exemplary structure of a radio protocol architecture used in the UMTS.

FIG. 3 shows an exemplary RRC connection process between a terminal and an UTRAN.

FIG. 4 illustrates an exemplary measurement reporting according to first embodiment of present invention.

FIG. 5 illustrates an exemplary measurement reporting according to second embodiment of present invention.

FIGS. 6 and 7 show an exemplary of segmented SDU(s) according to the present invention.

MODE FOR THE INVENTION

Reference will now be made in detail to the preferred embodiments of this disclosure, examples of which are illustrated in the accompanying drawings.

One aspect of the present invention is the recognition by the present inventors regarding the problems and drawbacks of the related art described above and explained in more detail hereafter. Based upon such recognition, the features of the present invention have been developed.

Although this disclosure is shown to be implemented in a mobile communication system, such as a UMTS developed under 3GPP specifications, this disclosure may also be applied to other communication systems operating in conformity with different standards and specifications.

FIG. 4 shows an exemplary measurement reporting according to first embodiment of present invention.

A terminal (UE) may perform a DRX (discontinuous reception) and periodically monitor a PICH (Paging Indicator Channel) channel according to the DRX performance. During the monitoring by the terminal, if the terminal receives an indicator or a paging by the PICH channel, the terminal may receive a paging message through a sub-frame of a HS-DSCH (High Speed-Downlink Shared Channel) channel that is corresponded or mapped to the PICH channel.

Here, if the paging message indicates to perform a measurement report of the terminal, the terminal may transmit a measurement report message to an uplink (i.e. a network, UTRAN, Node B, eNB, etc). After transmitting the measurement report message, the terminal may continuously perform the DRX in a CELL_PCH state, and may periodically monitor the PICH channel. Here, the measurement report message may transmit to the UTRAN through a RACH (random access channel) channel.

FIG. 5 shows an exemplary measurement reporting according to second embodiment of present invention.

A terminal (UE) may perform a DRX (discontinuous reception) and periodically monitor a PICH (Paging Indicator Channel) channel according to the DRX performance. During the monitoring by the terminal, if the terminal receives an indicator or a paging by the PICH channel, the terminal may receive or obtain a MAC PDU (Medium Access Control Protocol Data Unit) through a sub-frame of a HS-DSCH (High Speed-Downlink Shared Channel) channel that is corresponded or mapped to the PICH channel.

When the terminal receives the MAC PDU including a segmented (or concatenated or padded) MAC SDU(s) (Medium Access Control Service Data Unit), segmented RLC SDU(s) (Radio Link Control Service Data Unit), or segmented PDCP SDU(s) (Packet Data Convergence Protocol Service Data Unit), and the segmented MAC SDU(s) or RLC SDU(s) or PDCP SDU(s) are not completely reconfigured or reformed in the MAC PDU, the terminal may transmit a measurement report message to a UTRAN assuming that there are more downlink data to be received from the UTRAN. Here, the measurement report message may transmit to the UTRAN through a RACH (random access channel) channel.

FIG. 6 shows an exemplary case that segmented SDU(s) are not completely reconfigured or reformed in the MAC PDU. As illustrated in FIG. 6, a SDU 2, which is a last SDU of a PDU 1, is segmented into different PDUs (i.e., PDU 1, PDU 2), and a terminal can not completely reconfigure the SDU 2 by only receiving the PDU 1. In this case, if the terminal receives the PDU 1, the terminal may transmit a measurement report message to a UTRAN in an assumption of a transmission of a PDU 2 is expected to perform later on.

Here, the terminal may receive the PDU 2 first, and then may receive the PDU 1 later. In this case, if the terminal receives the PDU 1, the SDU 2 can be completely reconfigured by the terminal with the previously received PDU 2. Therefore, the measurement report message may not need to be transmitted to the UTRAN in this situation. However, before receiving of the PDU 1, the measurement report message may be transmitted to the UTRAN when the terminal receives the PDU 2 only.

In case that the segmented MAC SDU(s) or RLC SDU(s) or PDCP SDU(s) can be completely reconfigured, the terminal may not transmit the measurement repot message assuming that there is no more downlink data to be received from the UTRAN.

FIG. 7 shows an exemplary case that segmented SDU(s) can be completely reconfigured or reformed in the MAC PDU. As illustrated in FIG. 7, a terminal can completely reconfigure the all SDU(s) (i.e., SDU 1, SDU 2) by only receiving a PDU 1. In this case, when the terminal receives the PDU 1, the terminal may not transmit a measurement report message to a UTRAN.

Namely, if UE (terminal) continues staying in CELL_PCH state while receiving data on HS-DSCH, the UTRAN may need a RRC measurement reporting. To do this, the UTRAN may send a paging message for requesting RRC measurement reporting to the UE. In this case, the paging message may simply indicate that the UE should report RRC measurement results on RACH. During this procedure, the UE may continue to stay in CELL_PCH state. Here, if the RRC measurement report message is not successfully transmitted to the UTRAN, the UTRAN may request RRC measurement reporting again by sending the paging message to the UE again. The RRC measurement report message may be carried by a RLC UM mode.

When the UE receives an incomplete segmented MAC SDU or an incomplete segmented RLC SDU in the received MAC PDU on HS-DSCH, the UE may also send the RRC measurement report message on RACH. Specifically, if the UE receives the incomplete segmented MAC SDU or the incomplete segmented RLC SDU, the UE may expect there will be one or more subsequent MAC SDU or RLC SDU to be transmitted in a downlink. Thus, for the subsequent PDU, the UE may send the RRC measurement report message to the UTRAN such that the UTRAN may control a transmission of the subsequent PDU on HS-DSCH based on the measurement report. Compared to paging requesting measurement reporting, this may save downlink resource due to a paging transmission because the UE is triggered to send the RRC measurement report message for the expected next transmission without paging.

Furthermore, since there is more data to be transmitted in the downlink, when the UE receives the MAC PDU on the HS-DSCH including the segmented MAC SDU or the segmented RLC SDU which is not complete in the MAC PDU, the UE may perform a cell update with measurement results on the RACH. Here, the UE may know whether the MAC SDU or RLC SDU is complete or not in the MAC PDU by a MAC header or a RLC header included in the MAC PDU.

On the other hand, when the UE in CELL_PCH state receives the MAC PDU including a MAC SDU and/or RLC SDU which are complete in the MAC PDU, the UE may not send the measurement report. In this case, if the UTRAN needs measurement report, the UTRAN may send the paging requesting measurement reporting. A MAC header or a RLC header of the MAC PDU on the HS-DSCH may include a polling bit requesting RRC measurement reporting. Thus, if the UE in CELL_PCH state receives the MAC PDU on DCCH (Dedicated Control Channel) or DTCH (Dedicated Traffic Channel) and the MAC header or RLC header of the MAC PDU indicates the polling bit requesting RRC measurement reporting, the UE may send the RRC measurement report message on the RACH without state transition to CELL_FACH state. A HS-SCCH (High Speed-Shared Control Channel) associated with the HS-DSCH may also indicate a polling bit requesting RRC measurement reporting. Thus, if the UE in the CELL_PCH state receives a HS-SCCH frame and the HS-SCCH frame indicates the polling bit requesting RRC measurement reporting, the UE may send the RRC measurement report message on RACH without state transition to the CELL_FACH state.

As such, in CELL_PCH state, the UTRAN may command the UE to send RRC measurement report by sending a paging message which does not drive UE to perform a cell update. In addition, when the UE receives DTCH/DCCH on HS-DSCH, if the UE in the CELL_PCH state receives the MAC PDU on the HS-DSCH including the segmented MAC PDU or the segmented RLC PDU which is not complete in the MAC PDU, the UE may perform the cell update with measurement results on RACH. Otherwise, when the UE receives DTCH/DCCH on HS-DSCH, the UE may not need to perform the cell update.

It can be said that the present invention may provide a method of transmitting a measurement report of a mobile terminal in a wireless communications system, the method comprising: receiving at least one PDU (Protocol Data unit) including segmented SDU(s) (Service Data Unit); and determining whether or not to transmit the measurement report based on the segmented SDU(s) included in the received at least one PDU, wherein the at least one PDU is a MAC PDU and the segmented SDU(s) are either a segmented MAC SDU(s) or a segmented RLC SDU(s), the measure report is transmitted to a network when the segmented SDU(s) can not be reconfigured as complete SDU(s) in the at least one PDU, the measure report is not transmitted to a network when the segmented SDU(s) can be reconfigured as complete SDU(s) in the at least one PDU, the segmentation of the SDU(s) is performed by a MAC (Medium Access Control) layer or a RLC (Radio Link Control) layer of a network, the mobile terminal is in CELL_PCH state, the CELL_PCH state of the mobile terminal receives a downlink data while performing a DRX (Discontinuous reception), the at least one PDU is received via a HS-DSCH (High Speed Downlink Shared Channel), and the measurement report is transmitted through a RACH (Random Access Channel).

Also, the present invention may provide a method of transmitting a measurement report of a mobile terminal, the method comprising: receiving at least one PDU (Protocol Data unit) including a segmented SDU (Service Data Unit); and transmitting the measurement report to a network if the segmented SDU can not be completely reconfigured.

It can be said that the present invention may provide a method of transmitting a measurement report of a corresponding mobile terminal, the method comprising: monitoring a paging channel while performing a DRX (Discontinuous Reception); receiving a data channel including a paging message if the paging channel indicates the corresponding mobile terminal; and triggering the measurement report of the corresponding mobile terminal if the paging message indicates to trigger for the measurement report of the corresponding mobile terminal.

The present invention may provide a method of receiving a measurement report of a mobile terminal in a wireless communications system, the method comprising: transmitting at least one PDU (Protocol Data unit) including segmented SDU(s) (Service Data Unit), wherein the segmented SDU(s) included in the at least one PDU is used for determining whether or not to transmit the measurement report to a network by the mobile terminal, the at least one PDU is a MAC PDU and the segmented SDU(s) are either segmented MAC SDU(s) or segmented RLC SDU(s), the measure report is transmitted to the network when the segmented SDU(s) can not be reconfigured as complete SDU(s) in the at least one PDU, the measure report is not transmitted to a network when the segmented SDU(s) can be reconfigured as complete SDU(s) in the at least one PDU, the segmentation of the SDU(s) is performed by a MAC (Medium Access Control) layer or a RLC (Radio Link Control) layer of the network, the at least one PDU is received via a HS-DSCH (High Speed Downlink Shared Channel), and the measurement report is transmitted through a RACH (Random Access Channel).

Also, the present invention may provide a mobile terminal for transmitting a measurement report in a wireless communications system, the mobile terminal comprising: a radio protocol adapted to receive at least one PDU (Protocol Data unit) including segmented SDU(s) (Service Data Units) and to determine whether or not to transmit the measurement report based on the segmented SDU(s) included in the received at least one PDU.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention should not limit the scope of the present invention to a certain type of wireless communication system. The present invention is also applicable to other wireless communication systems using different air interfaces and/or physical layers, for example, TDMA, CDMA, FDMA, WCDMA, OFDM, EV-DO, Mobile Wi-Max, Wi-Bro, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of transmitting a measurement report of a mobile terminal in a wireless communications system, the method comprising:
    receiving at least one PDU (Protocol Data unit) including a segmented SDU (Service Data Unit); and
    determining whether or not to transmit the measurement report based on the segmented SDU included in the received at least one PDU,
    wherein the measurement report is transmitted to a network when the segmented SDU cannot be reconfigured as a complete SDU into the at least one PDU or the measurement report is not transmitted to the network when the segmented SDU can be reconfigured as complete SDU into the at least one PDU, and
    wherein the determining step is performed when the mobile terminal is in a specific state where the mobile terminal receives a downlink data including the segmented SDU while performing a DRX (Discontinuous reception).

2. The method of claim 1, wherein the at least one PDU is a MAC PDU and the segmented SDU is either a segmented MAC SDU or a segmented RLC SDU.

3. The method of claim 1, wherein the segmentation of the SDU is performed by a MAC (Medium Access Control) layer or a RLC (Radio Link Control) layer of a network.

4. The method of claim 1, wherein the at least one PDU is received via a HS-DSCH (High Speed Downlink Shared Channel).

5. The method of claim 1, wherein the measurement report is transmitted through a RACH (Random Access Channel).

6. A method of transmitting a measurement report of a mobile terminal, the method comprising:
    receiving at least one PDU (Protocol Data unit) including a segmented SDU (Service Data Unit); and
    selectively transmitting the measurement report to a network,
    wherein the measurement report is transmitted to the network if the segmented SDU cannot be completely reconfigured or the measurement report is not transmitted to the network if the segmented SDU can be completely reconfigured, and
    wherein the measurement report is transmitted when the mobile terminal is in a specific state that the mobile terminal receives a downlink data including the segmented SDU while performing a DRX (Discontinuous reception).

* * * * *